US005642064A

United States Patent [19]

Shimura

[11] Patent Number: 5,642,064
[45] Date of Patent: Jun. 24, 1997

[54] VOLTAGE TO CURRENT CONVERSION CIRCUIT INCLUDING A DIFFERENTIAL AMPLIFIER

[75] Inventor: Tatsuhisa Shimura, Fujisawa, Japan

[73] Assignee: Matsushita Electric Industrial Co., Ltd., Osaka, Japan

[21] Appl. No.: 675,368

[22] Filed: Jul. 2, 1996

Related U.S. Application Data

[63] Continuation of Ser. No. 365,679, Dec. 29, 1994, abandoned.

[30] Foreign Application Priority Data

Dec. 29, 1993 [JP] Japan .................................... 5-351981

[51] Int. Cl.[6] .................................................... H02M 11/00

[52] U.S. Cl. ............................. 327/103; 327/77; 327/87; 327/89

[58] Field of Search ............................... 327/103, 74, 76, 327/77, 89, 563, 87; 330/252, 257, 260

[56] References Cited

U.S. PATENT DOCUMENTS

| | | | |
|---|---|---|---|
| 3,684,973 | 8/1972 | Duck | 330/252 |
| 3,689,752 | 9/1972 | Gilbert | 330/252 |
| 4,047,052 | 9/1977 | Koubek et al. | 327/136 |
| 4,520,282 | 5/1985 | Watanabe et al. | 327/538 |
| 5,151,625 | 9/1992 | Zarabadi et al. | 327/103 |
| 5,223,743 | 6/1993 | Nakagawara | 327/103 |
| 5,391,981 | 2/1995 | Masson | 327/538 |

FOREIGN PATENT DOCUMENTS

| | | | |
|---|---|---|---|
| 1272996 | 7/1968 | Germany | 327/103 |

*Primary Examiner*—Timothy P. Callahan
*Assistant Examiner*—Kenneth B. Wells
*Attorney, Agent, or Firm*—Ratner & Prestia

[57] ABSTRACT

An accurate V/I conversion circuit converts an input voltage to an electric current which includes an external resistance in series with an input voltage V1. The external resistance is directly coupled to an input terminal of the V/I conversion circuit. V/I conversion circuit includes an input terminal coupled to the external resistance which is in series with the input voltage V1. V/I conversion circuit also includes (1) a resistance type voltage dividing circuit which generates a standard voltage by dividing a supply voltage, (2) a differential amplifier circuit comprising two transistors which compares a voltage of the input terminal with the standard voltage, (3) a third transistor which receives the collector voltage of one of the transistors in the differential amplifier where the third transistor is also connected between the input terminal and ground with a resistor in series, and (4) a fourth transistor which receives a collector voltage of one of the transistors of the differential amplifier. The fourth transistor is also connected between the supply voltage and the ground with a resistance in series. The output current flows through the fourth transistor. The V/I conversion circuit can be formed in an integrated circuit.

4 Claims, 3 Drawing Sheets

VOLTAGE TO CURRENT CONVERSION CIRCUIT INCLUDING A DIFFERENTIAL AMPLIFIER

This application is a continuation of application Ser. No. 08/365,679 filed Dec. 29, 1994, now abandoned.

FIELD OF THE INVENTION

The present invention relates to a voltage to current conversion circuit (hereinafter called V/I conversion circuit") employing a monolithic Integrated Circuit (hereinafter called IC) to produce an accurate output current.

BACKGROUND OF THE INVENTION

FIG. 3 illustrates a conventional V/I conversion circuit employing an IC. This circuit converts an input voltage V1 to an electric current Iout. In FIG. 3, Integrated Circuit (IC) 3 includes current sources I1, I2 and I3 and transistors Q1, Q2 and Q3. V2 is the supply voltage. A microprocessor is widely used to operate a device which employs the conventional V/I conversion circuit. When the microprocessor is used, generally, the output of the microprocessor is converted to a DC voltage using a D/A converter which is used as input voltage V1.

The input voltage V1 applied to the input terminal is compared with the voltage of node 1 including an emitter of Q1 and a base of Q2 using a differential amplifier circuit comprising Q2 and Q3. Then a voltage equivalent to the input voltage V1 is output to the base of Q1. Node 1 is connected to an external resistance R1 through a terminal. If R1 is provided as an internal resistance in the IC, the external resistance R1 is not needed. However, the internal resistance of the IC usually has a resistance value which varies widely causing a wide dispersion in output current Iout. The external resistance R1 is used in a V/I conversion circuit which requires accuracy.

The voltage of node 1 is maintained equivalent to the input voltage V1 using a negative-feedback-circuit comprising Q1 and Q2. As a result, the emitter current of Q1 becomes nearly equal to a value of divided voltage of node 1 by R1. When the current amplification factor of Q1 is high enough, the collector current is nearly equal to the emitter current, and the collector current is the output current Iout of the V/I conversion circuit. Since Iout equals V1/R1, Iout can be adjusted from outside of the IC by changing the input voltage V1.

SUMMARY OF THE INVENTION

The present invention provides an accurate V/I conversion circuit which converts an input voltage V1 to an electric current Iout. The V/I conversion circuit according to the present invention comprises an IC and an external resistance in series with an input voltage V1. The external resistance is directly coupled to an input terminal of the IC. The IC comprises an input terminal coupled to the external resistance which is in series with the input voltage V1. The IC also includes (1) a resistance voltage dividing circuit which generates a standard voltage by dividing a supply voltage, (2) a differential amplifier circuit comprising two transistors which compares a voltage of the input terminal with the standard voltage, (3) a third transistor receiving the collector voltage of one of the transistors in the differential amplifier where the third transistor is also connected between the input terminal and ground with a resistor in series, and (4) a fourth transistor receiving a collector voltage of one of the transistors of the differential amplifier where the fourth transistor is also connected between the supply voltage and the ground with a resistance in series. The output current flows through the fourth transistor.

DETAILED DESCRIPTION OF THE INVENTION

Figure 1:
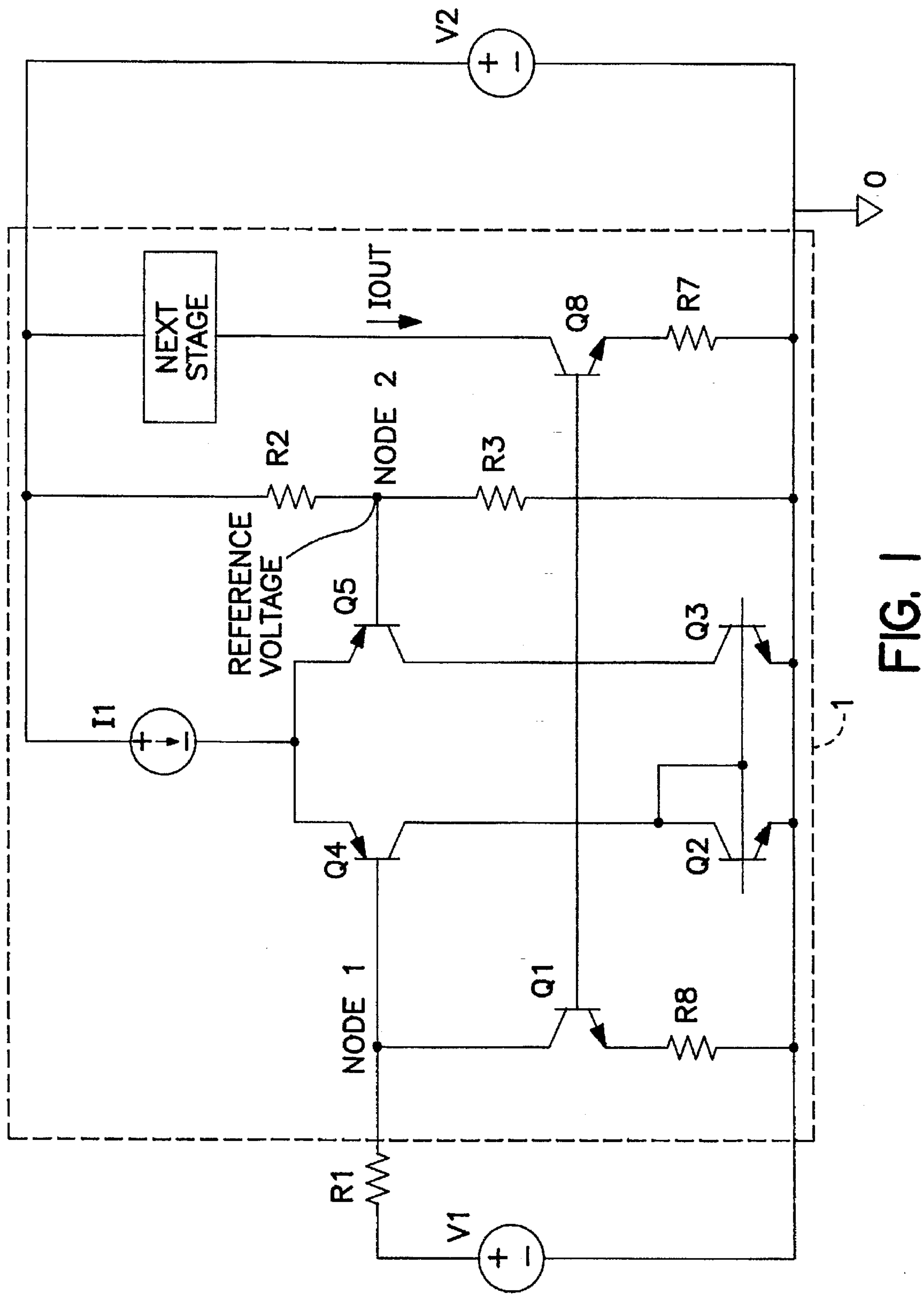
FIG. 1 is a circuit diagram of a V/I conversion circuit according to a first exemplary embodiment of the present invention.

FIG. 1 is a first exemplary embodiment of a V/I conversion circuit according to an exemplary embodiment of the present invention. In FIG. 1, IC 1 includes the components inside the broken line. I1 is a current source. An external resistance R1 is coupled in series with an input voltage V1 which is in turn coupled to the input terminal. The standard voltage of the differential amplifier comprising transistors Q2, Q3, Q4 and Q5 is generated dividing a supply voltage V2 with a voltage dividing circuit comprising resistors R2 and R3.

As previously stated, an internal resistance built in IC 1 has a wide dispersion in resistance value, however, since resistors R2 and R3 are both contained within the same IC the resistors R2 and R3 have the same dispersion. Accordingly, an accurate ratio of R2 versus R3 can be obtained. As a result, the voltage dividing circuit comprising R2 and R3 can generate an accurate standard voltage. The standard voltage node 2 is a reference voltage that is compared to the voltage at node 1 by the differential amplifier. A negative feedback circuit comprising the differential amplifier, transistor Q1 and resistor R8 is also included in IC 1. The voltage of node 1 is equal to the voltage of node 2 because of the negative feedback circuit. Neglecting a base current of Q4, the collector current of Q1 is determined according to equation (1) below.

$$Q1 \text{ collector current}=(V1-\text{voltage of node } 1)/R1 \quad (1)$$

The input of the circuit comprising transistor Q8 and resistor R7 is also input to a circuit comprising transistor Q1 and resistor R8. Provided transistors Q8 and Q1 have the same characteristics and resistors R7 and R8 have equal values, the output current Iout is equal to the collector current of Q1. Since the voltage of node 1 is equal to that of node 2, the output current Iout is determined according to equation (2) below.

$$Iout=(V1-\text{Standard voltage})/R1 \quad (2)$$

Figure 3:
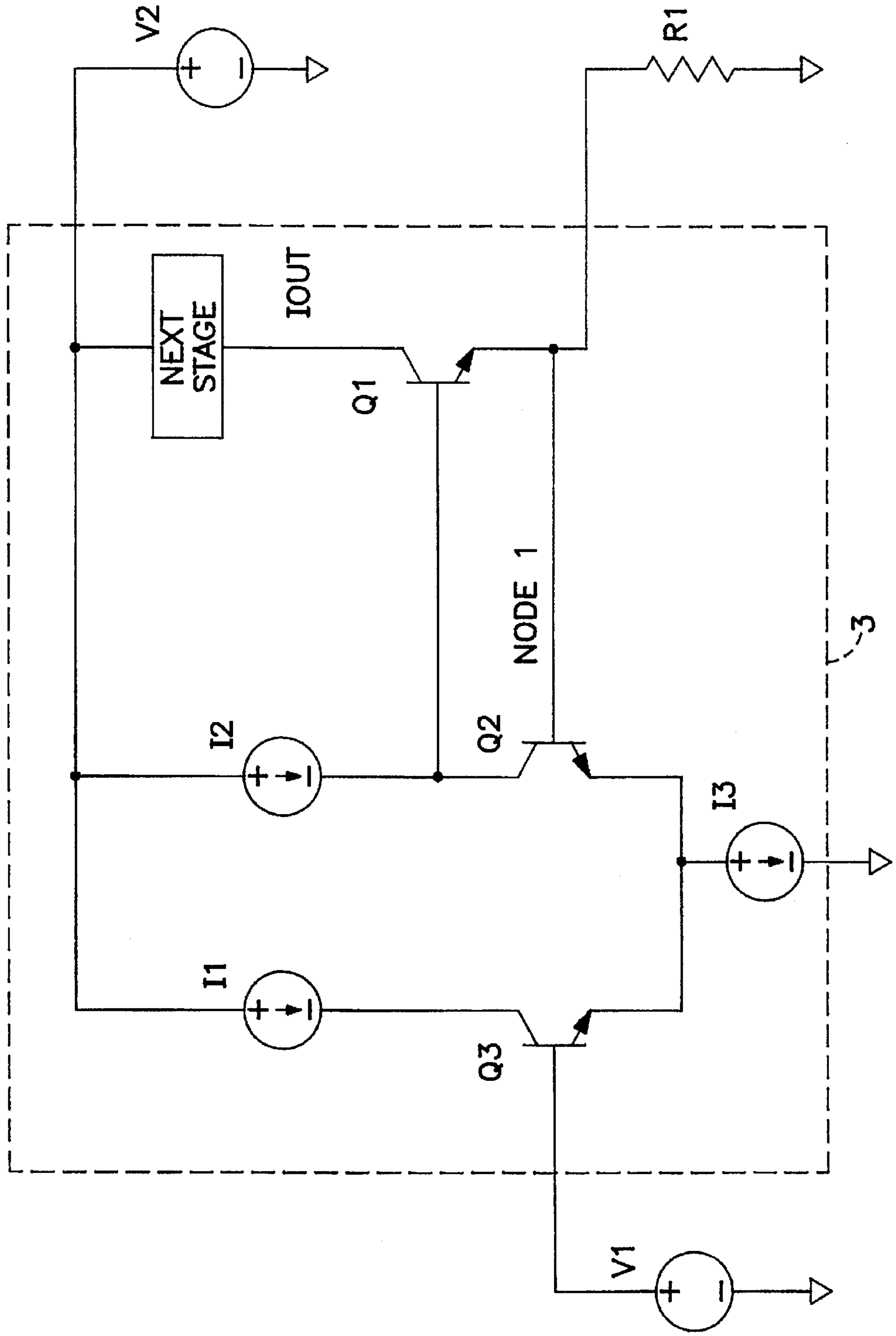
FIG. 3 PRIOR ART
FIG. 3 is a circuit diagram of a conventional V/I conversion circuit.

The output current Iout is supplied as an output of IC 1 or to the next step circuit inside IC 1. The output current Iout can be adjusted from outside of IC 1 by changing the input voltage V1 as is illustrated in equation (2). The V/I conversion circuit according to the invention has the following advantages:

(1) When the number of available IC terminals is increased, other circuits can be added in the IC to expand the number of functions of the IC. Therefore, if fewer terminals are assigned to the V/I conversion circuit, more circuits can be added to the IC. The exemplary embodiment of the present invention shown in FIG. 1 has one less terminal than the conventional circuit shown in FIG. 3. In FIG. 3, two terminals are needed for R1 and V1. In contrast, in FIG. 1, one terminal is needed for R1 and V1 because the external resistance R1 is coupled in series with the input voltage V1 between the input terminal and ground.

(2) According to the conventional circuit shown in FIG. 3, variation of the input voltage V1 may entail saturation in transistor Q1, which limits the dynamic range of transistor Q1. In the exemplary embodiment shown in FIG. 1, since the base voltage of transistor Q8 is kept lower than the voltage of node 2, a wider dynamic range can be maintained by keeping the voltage of node 2 low.

Figure 2:
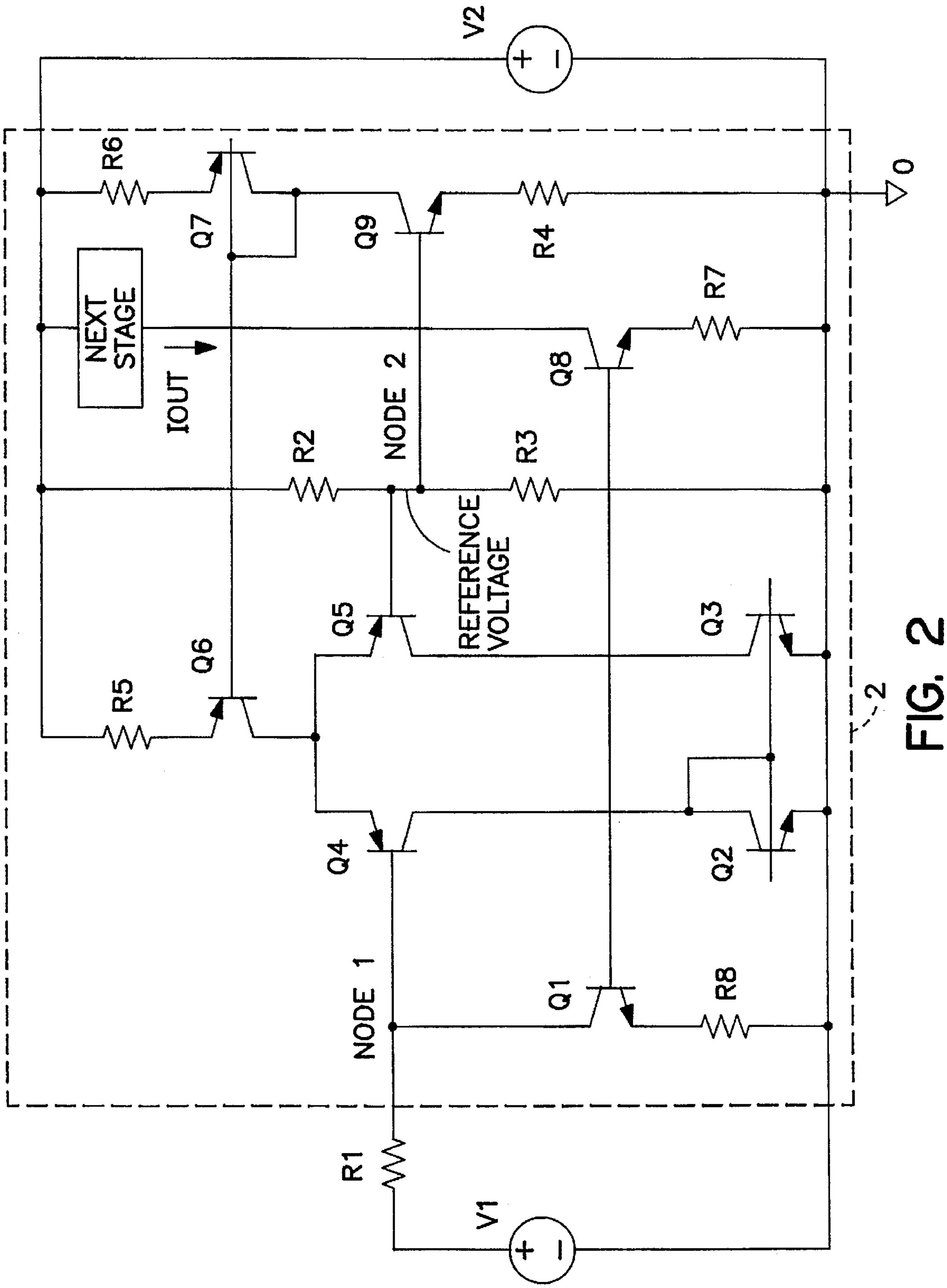
FIG. 2 is a circuit diagram of a V/I conversion circuit according to a second exemplary embodiment of the present invention.

FIG. 2 illustrates a second exemplary embodiment of the V/I conversion circuit. In FIG. 2, IC 2 includes the components inside the broken line. IC 2 includes a current source comprising transistors Q6, Q7, Q9 and resistors R4, R5 and R6. The operation of the second embodiment is the same as that of the first embodiment.

Although illustrated and described herein with reference to certain specific embodiments, the present invention is nevertheless not intended to be limited to the details shown. Rather, various modifications may be made within the scope and range of equivalents of the claims and without departing from the spirit of the invention.

What is claimed:

1. A linear voltage to current conversion circuit for converting an input voltage V1 to a current Iout comprising:

resistance voltage dividing means for receiving a supply voltage and for dividing said supply voltage to produce a reference voltage, differential amplifier means for comparing the reference voltage to a first voltage, said differential amplifier means having a first transistor receiving the first voltage, and a second transistor receiving said reference voltage, a third transistor receiving an output voltage from the second transistor, said third transistor coupled in series with a first resistor between said first voltage and ground, a fourth transistor receiving an output voltage from the second transistor, said fourth transistor coupled in series with a second resistor between said supply voltage and ground, said fourth transistor outputting the current Iout, and a series connection of a voltage source for producing the input voltage V1 and a resistor R1 connected between the first voltage and ground, wherein, said current Iout and said input voltage V1 satisfy the equation $$I\text{out}=(V1-\text{reference voltage})/R1,$$

whereby the input voltage V1 is linearly converted to a current Iout.

2. The linear voltage to current conversion circuit of claim 1, further comprising a current source coupled to the differential amplifier means.

3. The linear voltage to current conversion circuit according to claim 1, wherein the resistance voltage dividing means, the differential amplifier means, the third transistor, and the fourth transistor are contained in a monolithic integrated circuit.

4. The linear voltage to current conversion circuit of claim 1, further comprising a current mirror coupled to the differential amplifier, said current mirror having a fifth transistor and a sixth transistor.

* * * * *